US012437949B2

(12) United States Patent
Muniyappan et al.

(10) Patent No.: US 12,437,949 B2
(45) Date of Patent: Oct. 7, 2025

(54) VACUUM INTERRUPTER WITH SLOW OPENING SOLENOID CORE INSIDE TO SHORTEN THE LENGTH OF THE CONDUCTOR ASSEMBLY

(71) Applicant: EATON INTELLIGENT POWER LIMITED, Dublin (IE)

(72) Inventors: Jayaraman Muniyappan, Pernambut (IN); Robert Michael Slepian, Murrysville, PA (US); Santhosh Kumar Chamarajanagar Govinda Nayaka, Moon Township, PA (US); Ganesh Kumar Balasubramanian, Horseheads, NY (US)

(73) Assignee: EATON INTELLIGENT POWER LIMITED, Dublin (IE)

(*) Notice: Subject to any disclaimer, the term of this patent is extended or adjusted under 35 U.S.C. 154(b) by 289 days.

(21) Appl. No.: 18/093,387

(22) Filed: Jan. 5, 2023

(65) Prior Publication Data

US 2024/0234064 A1 Jul. 11, 2024

(51) Int. Cl.
*H01H 50/64* (2006.01)
*H01H 50/20* (2006.01)
(Continued)

(52) U.S. Cl.
CPC .......... *H01H 50/641* (2013.01); *H01H 50/20* (2013.01); *H01H 50/36* (2013.01); *H01H 50/44* (2013.01); *H01H 89/00* (2013.01)

(58) Field of Classification Search
None
See application file for complete search history.

(56) References Cited

U.S. PATENT DOCUMENTS 10,825,625 B1 * 11/2020 Marshall ............ H01H 33/6662
11,621,134 B1 * 4/2023 Cao .................... H01H 33/6662
335/6
(Continued)

FOREIGN PATENT DOCUMENTS

DE 198 08 083 C1 4/1999
DE 102 38 950 A1 3/2004
GB 2 606 587 A 11/2022

OTHER PUBLICATIONS

European Patent Office "International Search Report and Written Opinion" for corresponding International (PCT) Appl. No. PCT/EP2023/025561, dated Apr. 4, 2024, 16 pp.

*Primary Examiner* — Bernard Rojas
(74) *Attorney, Agent, or Firm* — Eckert Seamans Cherin & Mellott, LLC

(57) ABSTRACT

A vacuum circuit interrupter integrates a solenoid core within the vacuum chamber for opening the separable contacts under non-fault conditions, using less space than if the solenoid were disposed in series with a high speed actuator. The interrupter includes an iron core, a steel seat with a trough, and a solenoid coil seated in the trough. The steel seat has a central opening through which the movable conductor passes. The iron core is fixed to a portion of the movable conductor so as to laterally surround the movable conductor within the vacuum chamber. The steel seat is structured such that, when the separable contacts are closed and a user provides an activating current to the solenoid coil, the magnetic field generated around the coil magnetizes the steel seat. When the steel seat is magnetized, it attracts the iron core, causing the movable conductor to separate from the stationary conductor.

17 Claims, 4 Drawing Sheets

(51) Int. Cl.
*H01H 50/36* (2006.01)
*H01H 50/44* (2006.01)
*H01H 89/00* (2006.01)

(56) References Cited

U.S. PATENT DOCUMENTS

2020/0411261 A1 12/2020 Zhou et al.
2023/0283064 A1* 9/2023 Chen ...................... H02H 3/033

* cited by examiner

VACUUM INTERRUPTER WITH SLOW OPENING SOLENOID CORE INSIDE TO SHORTEN THE LENGTH OF THE CONDUCTOR ASSEMBLY

FIELD OF THE INVENTION

The disclosed concept relates generally to circuit interrupters, and in particular, to slow-open actuators used with movable conductor assemblies to open separable contacts of circuit interrupters under non-fault conditions.

BACKGROUND OF THE INVENTION

Circuit interrupters, such as for example and without limitation, circuit breakers, are typically used to protect electrical circuitry from damage due to an overcurrent condition, such as an overload condition, a short circuit, or another fault condition, such as an arc fault or a ground fault. Each pole assembly of a circuit interrupter typically includes mechanically separable electrical contacts, which operate as a mechanical switch. When the separable contacts are in a closed state such that they are in contact with one another, current is able to flow through any circuits connected to the circuit interrupter. When the separable contacts are in an open state such that they are physically separated from one another, current is prevented from flowing through any circuits connected to the circuit interrupter. The separable contacts may be operated either manually by way of an operator handle, remotely by way of an electrical signal, or automatically in response to a detected fault condition. Typically, such circuit interrupters include a high-speed actuator designed to rapidly open or close the separable contacts, and a trip mechanism, such as a trip unit, which can sense a number of fault conditions and automatically trip the high speed actuator to open the separable contacts upon sensing a fault condition.

Hybrid circuit interrupters, which are used in contexts when extremely fast opening of the separable contacts is required, employ a power electronic interrupter in addition to the mechanical separable contacts in each pole assembly. The electronic interrupter is connected in parallel with the mechanical contacts, and comprises electronics structured to commutate current after a fault is detected. Once current is commutated from the mechanical switch to the electronic interrupter, the mechanical separable contacts are able to separate with a reduced risk of arcing. It is advantageous to commutate as much current as possible to the electronic branch as quickly as possible and to open the mechanical separable contacts at fast speeds in order to limit the let-through current during a fault condition.

In addition to the high speed actuator and power electronic interrupter, hybrid circuit interrupters generally include a slow open actuator that can be used to open the separable contacts at relatively slow speeds under non-fault conditions, for example, when the circuit interrupter needs to be taken out of service for maintenance or repair. Including a slow open actuator extends the life of the high speed actuator and power electronic interrupter by ensuring the high speed actuator is only used when necessary. Mechanical separable contacts typically comprise one stationary contact disposed at the end of a stationary electrode stem, and one movable contact disposed at the end of a movable electrode stem, with the electrode stem being a component of a larger movable conductor assembly. The force required to open mechanical separable contacts quickly is large, due to the significant mass of the movable conductor assembly that must be driven open in order to separate the separable contacts during a fault condition, and the components of the movable conductor assembly also undergo wear and tear during high speed opening operations as a result of the high forces exerted during such operations.

The slow open actuator is often positioned in series with the high speed actuator, adding to the length and mass of the overall pole assembly, since the movable conductor assembly must be long enough to ensure that there is a sufficient separation between the high speed actuator and the slow open actuator. While the inclusion of a slow open actuator helps extend the life of the high speed actuator and movable conductor assembly by preventing the high speed actuator from being used during non-fault conditions, the typical arrangement of the high speed actuator and slow open actuator requires the exertion of higher forces on the movable conductor assembly during a high speed operation than would be required if the movable conductor assembly were shorter and had less mass. Hence, there is always a need for movable conductor assemblies that have a shorter length and lower mass than existing assemblies have, to facilitate faster opening of the mechanical contacts during a fault condition in order to minimize the let-through current.

There is thus room for improvement in slow open actuators used with movable conductor assemblies to open separable contacts of circuit interrupters under non-fault conditions.

SUMMARY OF THE INVENTION

These needs, and others, are met by a vacuum circuit interrupter that integrates a solenoid core within the vacuum chamber for opening the separable contacts at slow speeds under non-fault conditions. In addition to integrating the solenoid core within the vacuum chamber, a solenoid coil and a steel seat structured to be magnetized by the solenoid coil are positioned laterally around the movable conductor, using significantly less space than if the solenoid arrangement were disposed in series with a high speed actuator. The interrupter includes an iron core, a steel seat with a trough, and a solenoid coil seated in the trough. The steel seat has a central opening that enables a movable conductor to pass through during an opening stroke. The iron core is fixed to the movable conductor so as to laterally surround the movable conductor. The steel seat is structured such that, when the separable contacts are closed and a user provides an activating current to the solenoid coil, the magnetic field generated around the coil magnetizes the steel seat. When the steel seat is magnetized, it attracts the iron core, causing the movable conductor to separate from the stationary conductor.

In accordance with one aspect of the disclosed concept, a solenoid actuator arrangement for actuating travel of a movable conductor of a vacuum circuit interrupter from a closed state to an open state includes an actuator seat and an iron core. The actuator seat is fixed in position in the circuit interrupter, and includes a steel seat and a solenoid coil. The steel seat includes: an actuator seat central opening structured to receive the movable conductor and enable the movable conductor to travel in an opening direction, and a trough structured to surround the movable conductor. The solenoid coil is seated in the trough. The iron core is structured to be fixedly coupled to the movable conductor within a vacuum housing of the vacuum circuit interrupter so as to laterally surround a portion of the movable conductor within the vacuum housing. The steel seat is structured to be magnetized when current is supplied to the solenoid coil. The iron core and the steel seat are structured to cause the steel seat to attract the iron core when the steel seat is magnetized, and structured to cause the movable conductor to separate from a stationary conductor of the circuit interrupter when the iron core is coupled to the movable conductor and when the steel seat is magnetized.

In accordance with another aspect of the disclosed concept, a pole assembly for a circuit interrupter includes: a stationary conductor comprising a stationary separable contact; a movable conductor comprising a movable separable contact, with the movable conductor being structured to move between a closed state and an open state; a vacuum housing fixed in position in the circuit interrupter and positioned to contain the stationary separable contact and movable separable contact; and a solenoid actuator arrangement structured to actuate the movable conductor from the closed state to the open state. The solenoid actuator arrangement includes an actuator seat and an iron core. The actuator seat is fixed in position in the circuit interrupter, and includes a steel seat and a solenoid coil. The steel seat includes: an actuator seat central opening that receives the movable conductor and enables the movable conductor to travel in an opening direction, and a trough that surrounds the movable conductor. The solenoid coil is seated in the trough. The iron core is fixedly coupled to the movable conductor within the vacuum housing such that the iron core laterally surrounds a portion of the movable conductor within the vacuum housing. The steel seat is structured to be magnetized when current is supplied to the solenoid coil. The iron core and the steel seat are positioned relative to one another to enable the steel seat to attract the iron core when the steel seat is magnetized, and to cause the movable conductor to separate from the stationary conductor when the steel seat is magnetized.

In accordance with a further aspect of the disclosed concept, a hybrid circuit interrupter includes: a hybrid switch assembly connected between a power source and a load; a stationary conductor with a stationary separable contact; a movable conductor with a movable separable contact, the movable conductor being structured to move between a closed state and an open state; a high speed actuator configured to separate the mechanical separable contacts under fault conditions; a vacuum housing fixed in position in the circuit interrupter and positioned to contain the mechanical separable contacts; and a solenoid actuator arrangement configured to actuate the movable conductor from the closed state to the open state under non-fault conditions. The hybrid switch assembly comprises a pair of mechanical separable contacts including the stationary separable contact and the movable separable contact, and an electronic interrupter. The solenoid actuator arrangement includes an actuator seat and an iron core. The actuator seat is fixed in position in the circuit interrupter, and includes a steel seat and a solenoid coil. The steel seat includes: an actuator seat central opening that receives the movable conductor and enables the movable conductor to travel in an opening direction, and a trough that surrounds the movable conductor. The solenoid coil is seated in the trough. The iron core is fixedly coupled to the movable conductor within the vacuum housing such that the iron core laterally surrounds a portion of the movable conductor within the vacuum housing. The steel seat is structured to be magnetized when current is supplied to the solenoid coil. The iron core and the steel seat are positioned relative to one another to enable the steel seat to attract the iron core when the steel seat is magnetized, and to cause the movable conductor to separate from the stationary conductor when the steel seat is magnetized.

BRIEF DESCRIPTION OF THE DRAWINGS

A full understanding of the invention can be gained from the following description of the preferred embodiments when read in conjunction with the accompanying drawings in which.

DETAILED DESCRIPTION OF THE INVENTION

Figure 1:
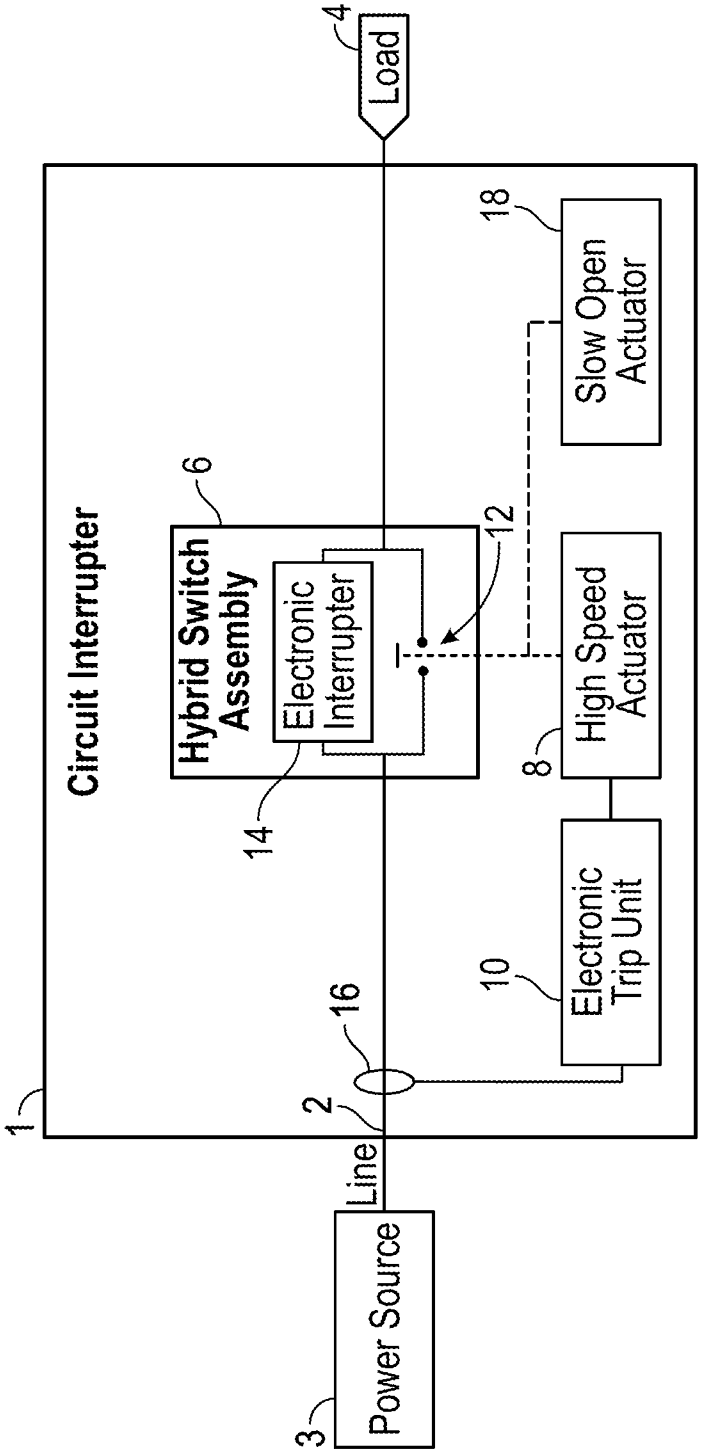
FIG. 1 is a schematic diagram of a hybrid circuit interrupter, in accordance with an example embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other.

As employed herein, when ordinal terms such as "first" and "second" are used to modify a noun, such use is simply intended to distinguish one item from another, and is not intended to require a sequential order unless specifically stated.

As employed herein, the term "number" shall mean one or an integer greater than one (i.e., a plurality).

FIG. 1 is a schematic diagram of a hybrid circuit interrupter 1 (e.g., without limitation, a circuit breaker), in accordance with an example embodiment of the disclosed concept. The circuit interrupter 1 includes a line conductor 2 structured to electrically connect a power source 3 to a load 4. The circuit interrupter 1 is structured to trip open to interrupt current flowing between the power source 3 and load 4 in the event of a fault condition (e.g., without limitation, an overcurrent condition) in order to protect the load 4, circuitry associated with the load 4, as well as the power source 3.

The circuit interrupter 1 further includes a hybrid switch assembly 6, a high speed actuator 8, and an electronic trip unit 10. The hybrid switch assembly 6 in FIG. 1 is a simplified depiction of a hybrid switch intended to demonstrate how current commutates past mechanical separable contacts 12 in a hybrid switch, and is not intended to be limiting on the different types of hybrid switch assemblies that can be included in a hybrid circuit interrupter 1. The hybrid switch assembly 6 comprises a set of mechanical separable contacts 12 and an electronic interrupter 14. The electronic trip unit 10 is structured to monitor power flowing through the circuit interrupter 1 via a current sensor 16 and/or other sensors and to detect fault conditions based on the power flowing through the circuit interrupter 1. Under normal operating conditions, the mechanical contacts 12 are in a closed state such that they are in contact with one another, enabling current to flow from the power source 3 through the line conductor 2 and the mechanical contacts 12 to the load 4. In addition, the electronic interrupter 14 is powered off under normal operating conditions, such that current cannot flow through the electronic interrupter 14.

In response to detecting a fault condition, the electronic trip unit 10 is configured to output a first signal to the electronic interrupter 14, in order to power on the electronic interrupter 14, and to output a second signal to the high speed actuator 8, to initiate actuation of the high speed actuator in order to open the mechanical contacts 12. Powering on the electronic interrupter 14 with the first signal enables the electronic interrupter 14 to commutate fault current from the mechanical contacts 12 to the electronic interrupter 14. The transmission of the second signal from the trip unit 10 to the high speed actuator 8 to open the mechanical contacts 12 forces the current to pass through the electronic interrupter 14, as current will not flow through the electronic interrupter 14 until the mechanical contacts 12 start to separate. The faster the mechanical contacts 12 separate, the lower the fault current flow through the electronic interrupter 14 will be. When the mechanical contacts 12 need to be opened under non-fault conditions, such as when maintenance or repairs are required, a slow open actuator 18 can instead be manually activated by a user, for example and without limitation by a button or handle disposed on the exterior of the circuit interrupter 1.

Figure 2:
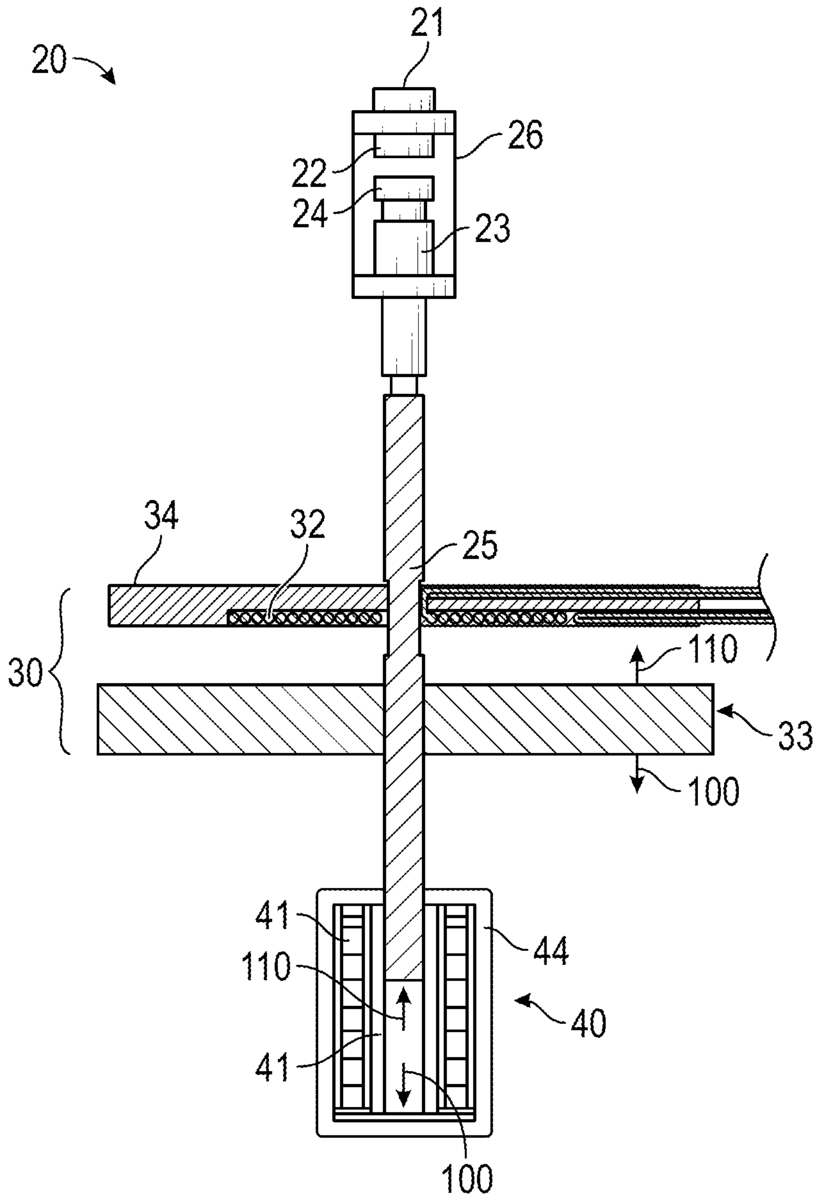
FIG. 2 (Prior Art)
FIG. 2 is sectional view of a prior art pole assembly that includes a slow open actuator positioned in series with a high speed actuator, which can be used to open the separable contacts of a vacuum circuit interrupter such as the circuit interrupter schematically depicted in FIG. 1.

FIG. 2 shows a sectional view of a prior art pole assembly 20 that includes a slow open actuator positioned in series with a high speed actuator for use in driving open a movable conductor assembly. The pole assembly 20 can, for example and without limitation, be used in a circuit interrupter such as the hybrid circuit interrupter 1 shown in FIG. 1. The pole assembly 20 includes a stationary conductor 21 comprising a stationary separable contact 22, and a movable conductor 23 comprising a movable separable contact 24. The stationary separable contact 22 and movable separable contact 24 correspond to the separable contacts 12 depicted in FIG. 1. The separable contacts 22, 24 are depicted as being open in FIG. 2. The movable conductor 23 is part of a larger movable conductor assembly comprising a drive shaft 25. The drive shaft 25 and movable conductor 23 are fixedly coupled to one another, and when the separable contacts 22, 24 need to be opened from a closed state, either a high speed actuator 30 or a slow open actuator 40 are activated to exert an opening force on the drive shaft 25, as detailed further hereinafter. The separable contacts 22, 24 are enclosed by a vacuum housing 26, which provides faster arc extinguishment during an opening operation than a non-vacuum environment.

The pole assembly 20 further includes a high speed actuator 30, which corresponds to the high speed actuator 8 depicted in FIG. 1. One type of actuator commonly used as a high speed actuator is a Thomson coil arrangement, which is the type of high speed actuator schematically depicted in FIG. 2. It is noted that it is known to use other types of high speed actuators instead of a Thomson coil arrangement, and the prior art actuator 20 shown in FIG. 2 is depicted as a Thomson coil arrangement for the sake of providing an illustrative example of how high speed actuators and slow open actuators are typically positioned in series relative to one another. The Thomson coil high speed actuator 30 comprises a planar coil 32 and a conductive plate 33. The planar coil 32 is planar relative to a plane disposed orthogonally to the viewing plane of FIG. 2, and the planar coil 32 is seated in a coil housing 34 fixedly positioned within the circuit interrupter 1. Both the planar coil 32 and the coil housing 34 comprise a central opening structured to receive the drive shaft and through which the drive shaft 25 can pass. The conductive plate 33 is fixedly coupled to the drive shaft 25.

When the separable contacts 22, 24 are closed and the trip unit 10 detects a fault condition, the trip unit 10 causes a time-varying current to be supplied to the planar coil 32. The flow of the time-varying current through the planar coil 32 causes opposing magnetic fields to be generated around the planar coil 32 and the conductive plate 33. The opposing orientations of the magnetic field around the planar coil 32 and the magnetic field around the conductive plate 33 relative to one another drives the conductive plate 33 away from the planar coil 32, resulting in the entire movable conductor assembly being driven in the direction indicated by arrow 100 in FIG. 2, which can be referred to as the opening direction 100. To re-close the separable contacts with a closing actuator (not discussed in detail in the present disclosure), the movable conductor assembly is pushed in the direction indicated by arrow 110 in FIG. 2, which can be referred to as the closing direction 110.

When the separable contacts 22, 24 are closed and need to be opened at a relatively slow speed under non-fault conditions, a user can selectively activate the slow open actuator 40, which corresponds to the slow open actuator 18 depicted in FIG. 1. Solenoid arrangements are commonly used as slow open actuators in circuit interrupters, and the slow open actuator 40 shown in FIG. 2 is a solenoid. The solenoid slow open actuator 40 comprises a solenoid coil 41 wound around a magnetizable core 42 and housed in a solenoid housing 44. The magnetizable core 42 and solenoid housing 44 each comprise a central opening proportioned to enable the drive shaft 25 to freely pass through as the drive shaft 25 moves in the opening and closing directions 100 and 110. When a user activates the solenoid slow open actuator 40, time-varying current is supplied to the solenoid coil 41, generating a magnetic field around the magnetizable core 42. The magnetic field around the magnetizable core 42 attracts the end of the drive shaft 25 and pulls the drive shaft 25 further into the central opening of the magnetizable core 42, resulting in the entire movable conductor assembly being driven in the opening direction 100.

Figure 3:
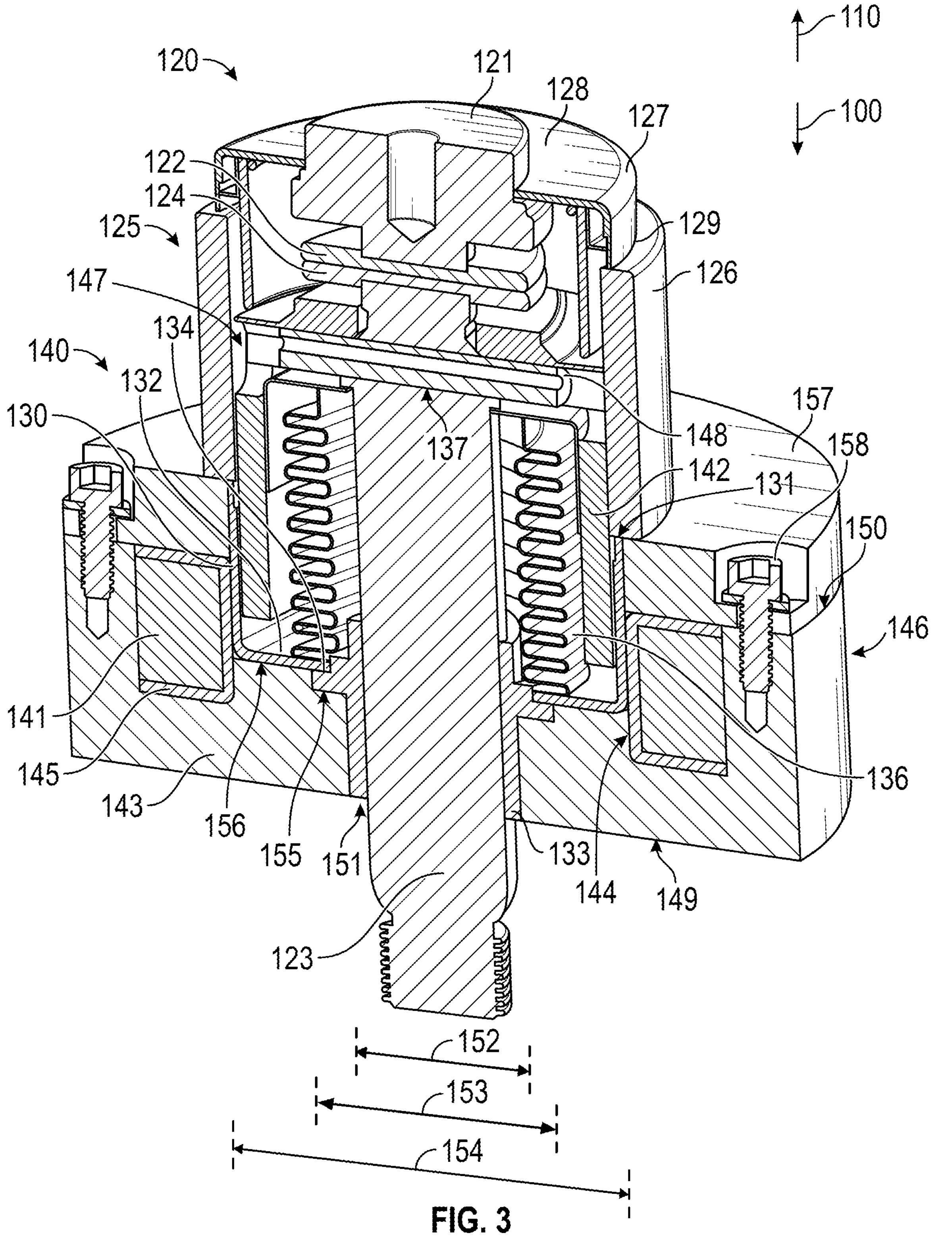
FIG. 3 is a partial isometric sectional view of a portion of an improved pole assembly with a vacuum interrupter that includes a slow opening solenoid core integrated within the vacuum chamber and a solenoid coil and magnetizable steel portion positioned outside the vacuum chamber, in accordance with example embodiments of the disclosed concept.

Referring now to FIG. 3, a partial isometric sectional view of a portion of a pole assembly 120 with a vacuum interrupter that includes a slow opening solenoid core integrated within the vacuum chamber is shown, in accordance with an example embodiment of the disclosed concept. The disclosed pole assembly 120 can, for example and without limitation, be used in a circuit interrupter such as the hybrid circuit interrupter 1 shown in FIG. 1. Similar to the prior art pole assembly 20 shown in FIG. 2, the disclosed pole assembly 120 includes a stationary conductor 121 comprising a stationary separable contact 122, and a movable conductor 123 comprising a movable separable contact 124, with the separable contacts 122 and 124 being enclosed in a vacuum housing 125. The stationary separable contact 122 and movable separable contact 124 correspond to the separable contacts 12 depicted in FIG. 1.

It is noted that the portion of the pole assembly 120 shown in FIG. 3 shows only the slow open actuator portion (detailed further hereinafter and corresponding to the slow open actuator 18 shown in FIG. 1) of the pole assembly 120, and that a high-speed actuator can be coupled to the portion of the pole assembly 120 shown in FIG. 3. Specifically, the movable conductor 123 shown in FIG. 3 is structured to be part of a larger movable conductor assembly and coupled to a drive shaft in order to be actuated by a high speed actuator during a fault condition. For example and without limitation, the drive shaft 25 shown in FIG. 2 can be coupled to the movable conductor 123 shown in FIG. 3, and the Thomson coil high speed actuator 30 shown in FIG. 2 can be arranged relative to the drive shaft 25 in order to actuate the movable conductor 123 shown in FIG. 3 during a fault condition in the same manner previously described in conjunction with FIG. 2 for the movable conductor 23. The separable contacts 122, 124 are depicted as being closed in FIG. 3, and the movable conductor 123 is structured to move in the opening direction 100 during an opening stroke, and to move in the closing direction 110 when the separable contacts 122, 124 need to be re-closed after an opening operation.

As an initial matter, it is noted that the terms "axial," "lateral," "proximal," and "distal" are used hereinafter to specify the orientations of various components of the disclosed pole assembly 120. The term "axial" is used to refer to the directions indicated by arrows 100 and 110, which are substantially upward and downward relative to the view shown in FIG. 3. The term "lateral" is used to refer to those directions disposed orthogonally to the axial directions. The term "proximal" is used to refer to the end or side of a component disposed closest to the separable contacts 122, 124, and the term "distal" is used to refer to the end or side of a component of the pole assembly 120 disposed furthest away from the separable contacts 122, 124. The term "proximally" is used to indicate movement or orientation toward the separable contacts 122, 124 and the term "distally" is used to indicate movement or orientation away from the separable contacts 122, 124.

Continuing to refer to FIG. 3, the vacuum housing 125 comprises a ceramic housing body 126, a seal cup 127, and a bellow anchoring cup 130. The base 128 of the seal cup 127 has a central opening (not numbered in the figures) that receives the stem of the stationary conductor 121, and the stem of the stationary conductor extends distally from the interior of the vacuum housing 125 through the central opening of the seal cup 127 to the exterior of the vacuum housing 125 such that the distal end of the stationary conductor is disposed externally to the vacuum housing 125. The seal cup base 128 is coupled to the stationary conductor 121 at the central opening of the seal cup base 128 so as to form an air-tight seal with the stationary conductor 121. The rim 129 of the seal cup 127 is coupled to the proximal end of the ceramic housing body 126. The rim 131 of the bellow anchoring cup 130 is coupled to the distal end of the ceramic housing body 126. The base 132 of the bellow anchoring cup 130 comprises a central opening (not numbered in the figures) structured to receive the stem of the movable conductor 123 with a bushing 133 positioned around the movable conductor 123.

The central opening (not numbered in the figures) of the bushing 133 is proportioned to ensure that the bushing 133 fits closely around the movable conductor 123, in order to stabilize the movable conductor 123 as its moves in the axial directions 100 and 110, while also enabling the movable conductor 123 to move freely in the axial directions 100 and 110. The exterior of the bushing 133 is formed with a step 134 that extends laterally outward away from the movable conductor 123 and is positioned between the proximal and distal ends of the bushing 133. The base 132 of the bellow anchoring cup 130 sits on the bushing step 134 and is coupled to the bushing step 134, such that one portion of the bushing 133 is disposed within the vacuum housing 125 and extends proximally into the vacuum housing 125 through the central opening of the bellow anchoring cup 130, while another portion of the bushing 133 is disposed externally to the vacuum housing 125, extending distally out of the vacuum housing 125 from the base 132 of the bellow anchoring cup 130.

A set of bellows 136 is positioned within the bellow anchoring cup 130 so that the bellows 136 laterally surrounds the stem of the movable conductor 123. The distal-most convolution of the bellows 136 is coupled to the proximal side of the base 132 of the bellow anchoring cup 130, via brazing for example and without limitation. It will be appreciated that brazing the distal-most convolution to the base 132 of the bellows shielding cup 134, along with coupling the base 128 of the seal cup 127 to the stationary conductor 121 to form an air-tight seal with the stationary conductor 127, seals the interior of the vacuum housing 125, enabling the vacuum housing 125 to be suitable for use as a vacuum chamber. In addition, the movable conductor 123 comprises a number of fastener receiving slots 137 extending laterally through the movable conductor 123 and structured to receive a corresponding number of fasteners, in order to couple an iron core of a solenoid arrangement 140 of the pole assembly 120 to the movable conductor 123, as detailed further later herein.

The disclosed pole assembly 120 further includes a solenoid slow open actuator arrangement 140, referred to hereinafter as the solenoid arrangement 140 for brevity. However, the disclosed pole assembly 120 integrates the solenoid arrangement 140 with the vacuum chamber formed by the vacuum housing 125, in contrast with the prior art pole assembly 20 shown in FIG. 2, wherein the solenoid slow open actuator 40 is positioned in series with the Thomson coil high speed actuator 30. The solenoid arrangement 140 includes a solenoid coil 141, an iron core 142, and a steel seat 143 comprising a trough 144. The steel seat 143, the trough 144, and the solenoid coil 141 all surround the stem of the movable conductor 123. The solenoid arrangement 140 further comprises an insulative ring 145 structured to function as a bobbin for the solenoid coil 141, and in an example embodiment, the insulative ring 145 is a thin insulative film. The solenoid coil 141 is coupled to the insulative ring 145 and seated in the trough 144. The composite structure that is formed by the solenoid coil 141 within the insulative ring 145 being seated in the trough 144 of the steel seat 143 can be referred to as the solenoid actuator seat 146.

The iron core 142 comprises a number of fastener receiving openings 147 that receive a number of fasteners 148 and correspond to the fastener receiving slots 137 in the movable conductor 123. In an example embodiment, the fasteners

148 are dowels. The fasteners 148 are referred to hereinafter as dowels 148, but it will be appreciated that components other than dowels may be suitable for fastening the iron core 142 to the movable conductor 123 and may be used instead of dowels without departing from the scope of the disclosed concept. The iron core 142 is structured to be positioned laterally around the movable conductor 123 such that the iron core fastener receiving openings 147 can align with the corresponding fastener receiving slots 137 in the movable conductor 123, enabling the dowels 148 to be inserted into the iron core fastener receiving openings 147 all the way into the movable conductor fastener receiving slots 137, in order to fixedly couple the iron core 142 laterally around the movable conductor 123.

The iron core 142 is axially shorter than the movable conductor 123 and is proportioned such that, when the iron core 142 is coupled to the movable conductor 123 within the vacuum housing 125 and the separable contacts 122 and 124 are closed, the iron core 142 is disposed between the proximal and distal ends of the movable conductor 123, and there is a gap between the distal end of the iron core 142 and the base 132 of the bellow anchoring cup 130. The iron core 142 is formed with a central cutout (not numbered in the figures) structured to fit around the bellows 136, with the central cutout extending from the distal end of the iron core 142 toward the proximal end of the iron core 142, such that the iron core 142 laterally surrounds the bellows 136.

As previously noted, the composite structure that is formed by the solenoid coil 141 within the insulative ring 145 being seated in the trough 144 of the steel seat can be referred to as the solenoid actuator seat 146. The solenoid actuator seat 146 comprises a central opening 151 extending from the distal end 149 of the steel seat 143 toward the proximal end 150 of the steel seat 143, with a first section of the central opening 151 having a first width 152, a second section of the central opening 151 having a second width 153, and a third section of the central opening 151 having a third width 154, with the second width 153 being wider than the first width 152 and the third width 154 being wider than the second width 153. Because each of the first, second, and third sections of the actuator seat central opening 151 is defined by the respective first, second, and third widths 152, 153, and 154, the first section is referred to hereinafter as the first section 152, the second section is referred to hereinafter as the second section 153, and the third section is referred to hereinafter as the third section 154.

In a plane where the actuator seat central opening first section 152 meets the second section 153, the steel seat 143 comprises a bushing seating surface 155, upon which a surface of the bushing 133 is seated. As shown in FIG. 3, the actuator seat central opening first section 152 is structured to receive the movable conductor 123 with a first portion of the bushing 133 fitted around the movable conductor 123, and the actuator seat central opening second section 153 is structured to receive the movable conductor 123 with a second portion of the bushing 133 fitted around the movable conductor 123, said second portion of the bushing 133 being wider than said first portion of the bushing 133 and wider than the actuator seat first section 152. In a plane where the actuator seat central opening second section 153 meets the third section 154, the steel seat 143 comprises a vacuum housing seating surface 156. The vacuum housing seating surface 156 is the surface on which the base 132 of the bellow anchoring cup 130 is seated. In the example embodiment shown in FIG. 3, the components of the pole assembly are proportioned such that a portion of the vacuum housing 125 is laterally adjacent to a portion of the solenoid coil 141 within the insulative ring 145 seated in the trough 144.

The pole assembly 120 further comprises an insulative cap 157 whose distal side is fastened to the proximal side of the solenoid actuator seat 146, in order to insulate the solenoid coil 141 from the exterior environment. Due to the wall of the ceramic housing body 126 being wider than the wall of the bellow shield cup 130 and extending further laterally outward from the movable conductor 123 than the wall of the bellow shield cup 130 does, the proximal side of the insulative cap 157 engages the distal end of the ceramic housing body 126. As shown in FIG. 3, the insulative cap 157 is fastened to the steel seat 143 using a number of fasteners 158. In an example embodiment, the fasteners 158 are screws, although other fastening components that are suitable for fastening the insulative cap 157 to the steel seat 143 can be used instead of screws without departing from the scope of the disclosed concept.

When the separable contacts 122, 124 are closed and need to be opened by the solenoid arrangement 140, under non-fault conditions for example, a user can selectively activate the solenoid coil 141. When a user activates the solenoid coil 141, time-varying current is supplied to the solenoid coil 141, causing a magnetic field to be generated around the solenoid coil 141. The steel seat 143 provides a return path for the generated magnetic field, which attracts the iron core 142. The attraction between the iron core 142 and the steel seat 143 drives the entire movable conductor assembly comprising the movable conductor 123 and the iron core 142 in the opening direction 100. It will be appreciated that the steel seat 143 is produced from steel in an example embodiment due to the ease with which steel can be magnetized, and that the iron core 142 is produced from iron in an example embodiment due to iron being ferromagnetic. However, the seat 143 can be produced from a magnetizable material other than steel and the core 142 can be produced from a ferromagnetic material other than iron without departing from the scope of the disclosed concept.

Figure 4:
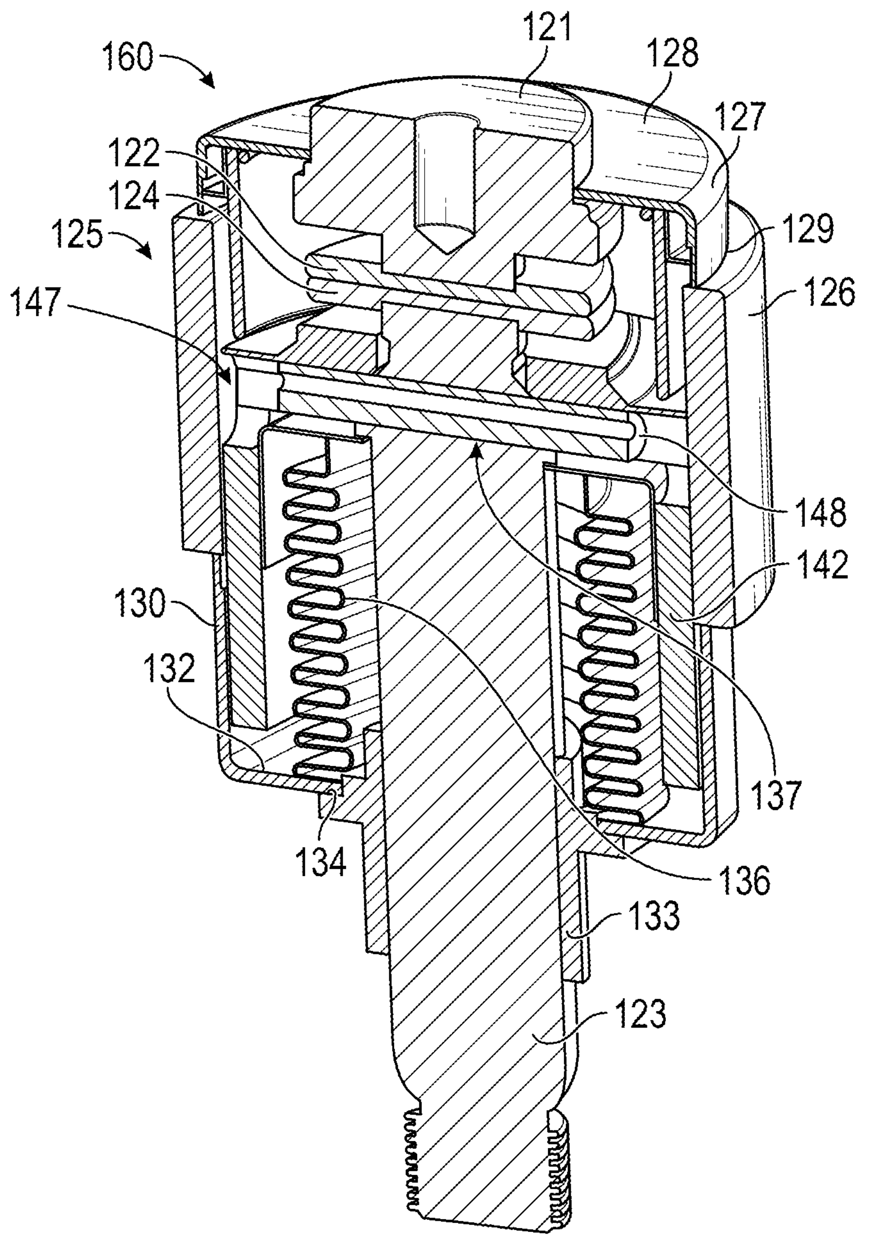
FIG. 4 is a partial isometric sectional view of the vacuum interrupter of the pole assembly shown in FIG. 3, prior to completion of assembly of the pole assembly shown in FIG. 3, in accordance with example embodiments of the disclosed concept.

Referring now to FIG. 4 in addition to FIG. 3, it is noted that the pole assembly 120 shown in FIG. 3 is structured such that the vacuum interrupter 160 (the vacuum interrupter 160 being numbered only in FIG. 4) of the pole assembly 120 can be assembled first (as shown in FIG. 4), and the solenoid actuator seat 146 with the insulative cap 157 attached can then be coupled to the assembled vacuum interrupter 160 in order to complete the pole assembly 120. FIG. 4 shows only the assembled vacuum interrupter 160 of the pole assembly 120, prior to the addition of the solenoid actuator seat 146 and insulative cap 157. It is noted that the iron core 142 is coupled to the movable conductor 123 during assembly of the vacuum interrupter 160, as can be seen in FIG. 4, and that the actuator seat 146 and insulative cap 157 are structured to be coupled to the exterior of the vacuum interrupter 160.

In comparing the disclosed pole assembly 120 shown in FIG. 3 to the prior art pole assembly 20 shown in FIG. 2, it is evident that the disclosed pole assembly 120 uses significantly less vertical space ("vertical" being relative to the views shown in FIG. 2 and FIG. 3) than the prior art pole assembly 20. In addition, a drive shaft coupled to the movable conductor 123 of the disclosed pole assembly 120 would not need to be as long when as the drive shaft 25 coupled to the prior art movable conductor 23, since a drive shaft coupled to the movable conductor 123 would only need to be long enough to accommodate the positioning of a high speed actuator, rather than the positioning of both a high speed actuator and a slow open actuator. The shorter length required of a drive shaft coupled to the movable conductor 123 results in the drive shaft having lesser mass and the overall movable conductor assembly having lesser mass than the prior art movable conductor assembly, which results in faster opening of the separable contacts 122, 124 when the same force is applied by a high speed actuator to drive open the movable conductor assembly under fault conditions.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of disclosed concept which is to be given the full breadth of the claims appended and any and all equivalents thereof.

What is claimed is:

1. A solenoid actuator arrangement for actuating travel of a movable conductor of a vacuum circuit interrupter from a closed state to an open state, the movable conductor comprising a movable separable contact, the vacuum circuit interrupter including a vacuum housing fixed in position and positioned to contain the movable separable contact and a stationary separable contact, the solenoid actuator arrangement comprising:

an actuator seat, the actuator seat being fixed in position in the circuit interrupter and comprising:

a steel seat, the steel seat comprising:

an actuator seat central opening structured to receive the movable conductor and enable the movable conductor to travel in an opening direction; and a trough structured to surround the movable conductor; and a solenoid coil seated in the trough; and an iron core, the iron core being structured to be fixedly coupled to the movable conductor within the vacuum housing of the vacuum circuit interrupter so as to laterally surround a portion of the movable conductor within the vacuum housing, wherein the steel seat is structured to be magnetized when current is supplied to the solenoid coil, wherein the iron core and the steel seat are structured to cause the steel seat to attract the iron core when the steel seat is magnetized, and wherein the iron core and steel seat are structured to cause the movable conductor to separate from a stationary conductor of the circuit interrupter when the iron core is coupled to the movable conductor and when the steel seat is magnetized.

2. The solenoid actuator arrangement of claim 1, wherein the iron core comprises a central cutout extending from a distal end of the iron core toward a proximal end of the iron core, wherein the iron core central cutout is structured to enable a set of bellows to be coupled to one end of an interior of the vacuum housing, and to enable the bellows to laterally surround the movable conductor and be positioned laterally between the movable conductor and the iron core when the iron core is coupled to the movable conductor.

3. A pole assembly for a circuit interrupter, the pole assembly comprising:

a stationary conductor comprising a stationary separable contact;

a movable conductor comprising a movable separable contact, the movable conductor being structured to move between a closed state and an open state;

a vacuum housing fixed in position in the circuit interrupter and positioned to contain the stationary separable contact and movable separable contact; and a solenoid actuator arrangement structured to actuate the movable conductor from the closed state to the open state, the solenoid actuator arrangement comprising:

an actuator seat, the actuator seat being fixed in position in the circuit interrupter and comprising:

a steel seat, the steel seat comprising:

an actuator seat central opening that receives the movable conductor and enables the movable conductor travel in an opening direction; and a trough that surrounds the movable conductor; and a solenoid coil seated in the trough; and an iron core fixedly coupled to the movable conductor within the vacuum housing such that the iron core laterally surrounds a portion of the movable conductor within the vacuum housing, wherein the steel seat is structured to be magnetized when current is supplied to the solenoid coil, wherein the iron core and the steel seat are positioned relative to one another to enable the steel seat to attract the iron core when the steel seat is magnetized, and to cause the movable conductor to separate from the stationary conductor when the steel seat is magnetized.

4. The pole assembly of claim 3, wherein the vacuum housing comprises a set of bellows, wherein the iron core comprises a central cutout extending from a distal end of the iron core toward a proximal end of the iron core, wherein the iron core central cutout is structured to enable the set of bellows to be coupled to one end of an interior of the vacuum housing, and to enable the bellows to laterally surround the movable conductor and be positioned laterally between the movable conductor and the iron core.

5. The pole assembly of claim 3, further comprising:

a number of dowels, wherein the movable conductor comprises a number of fastener receiving slots, wherein the iron core comprises a number of fastener receiving openings, wherein the iron core is positioned laterally around the movable conductor such that the fastener receiving openings in the iron core align with corresponding fastener receiving slots in the movable conductor, and wherein the dowels are inserted into the fastener receiving openings in the iron core and into the fastener receiving slots in the movable conductor to fixedly couple the iron core to the movable conductor.

6. The pole assembly of claim 3, further comprising:

a high speed actuator structured to actuate the movable conductor from the closed state to the open state at a higher speed than the solenoid actuator arrangement, wherein the high speed actuator is disposed distally relative to the solenoid actuator arrangement.

7. The pole assembly of claim 3, further comprising:

a bushing positioned laterally around the movable conductor within the actuator seat central opening, wherein the actuator seat central opening extends from a distal side of the steel seat to a proximal side of the steel seat, and comprises a first section with a first width, a second section with a second width, and a third section with a third width, wherein, in a plane in which the first section of the actuator seat central opening meets the second section of the actuator seat central opening, the steel seat comprises a bushing seating surface on which a portion of the bushing is seated, and wherein, in a plane in which the second section of the actuator seat central opening meets the third section of the actuator seat central opening, the steel seat comprises a vacuum housing seating surface on which the vacuum housing is seated.

8. The pole assembly of claim 7, further comprising:

an insulative cap coupled to a proximal side of the actuator seat, wherein the vacuum housing comprises a bellow shielding cup and a ceramic housing body, wherein a base of the bellow shielding cup is seated on the vacuum housing surface, wherein a rim of the bellow shielding cup is coupled to a distal end of the ceramic housing body, and wherein a proximal side of the insulative cap engages the distal end of the ceramic housing body.

9. The pole assembly of claim 3, wherein the stationary conductor, movable conductor, and vacuum housing form a vacuum interrupter such that the iron core is disposed within an interior of the vacuum housing, and wherein the actuator seat is structured to be coupled to the exterior of the vacuum interrupter.

10. A hybrid circuit interrupter, the hybrid circuit interrupter comprising:

a hybrid switch assembly connected between a power source and a load, the hybrid switch assembly comprising:

a pair of mechanical separable contacts including a stationary separable contact and a movable separable contact; and an electronic interrupter;

a stationary conductor comprising the stationary separable contact;

a movable conductor comprising the movable separable contact, the movable conductor being structured to move between a closed state and an open state;

a high speed actuator configured to separate the mechanical separable contacts under fault conditions;

a vacuum housing fixed in position in the circuit interrupter and positioned to contain the mechanical separable contacts; and a solenoid actuator arrangement configured to actuate the movable conductor from the closed state to the open state under non-fault conditions, the solenoid actuator arrangement comprising:

an actuator seat, the actuator seat being fixed in position in the circuit interrupter and comprising:

a steel seat, the steel seat comprising:

an actuator seat central opening that receives the movable conductor and enables the movable conductor travel in an opening direction; and a trough that surrounds the movable conductor; and a solenoid coil seated in the trough; and an iron core fixedly coupled to the movable conductor within the vacuum housing such that the iron core laterally surrounds a portion of the movable conductor within the vacuum housing, wherein the steel seat is structured to be magnetized when current is supplied to the solenoid coil, wherein the iron core and the steel seat are positioned relative to one another to enable the steel seat to attract the iron core when the steel seat is magnetized by the solenoid coil, and to cause the movable conductor to separate from the stationary conductor when the steel seat is magnetized.

11. The hybrid circuit interrupter of claim 10, wherein the high speed actuator is structured to actuate the movable conductor from the closed state to the open state at a higher speed than the solenoid actuator arrangement, and wherein the high speed actuator is disposed distally relative to the solenoid actuator arrangement.

12. The hybrid circuit interrupter of claim 11, further comprising:

a drive shaft coupled to a distal end of the movable conductor, wherein the high speed actuator is a Thomson coil actuator, the Thomson coil actuator comprising:

a planar coil seated in a coil housing fixedly positioned within the circuit interrupter, the planar coil and the coil housing both comprising a central opening through which the drive shaft can pass; and a conductive plate fixedly coupled to the drive shaft.

13. The hybrid circuit interrupter of claim 10, wherein the vacuum housing comprises a set of bellows, wherein the iron core comprises a central cutout extending from a distal end of the iron core toward a proximal end of the iron core, wherein the iron core central cutout is structured to enable the set of bellows to be coupled to one end of an interior of the vacuum housing, and to enable the bellows to laterally surround the movable conductor and be positioned laterally between the movable conductor and the iron core.

14. The hybrid circuit interrupter of claim 10, further comprising:

a number of dowels, wherein the movable conductor comprises a number of fastener receiving slots, wherein the iron core comprises a number of fastener receiving openings, wherein the iron core is positioned laterally around the movable conductor such that the fastener receiving openings in the iron core align with corresponding fastener receiving slots in the movable conductor, and wherein the dowels are inserted into the fastener receiving openings in the iron core and into the fastener receiving slots in the movable conductor to fixedly couple the iron core to the movable conductor.

15. The hybrid circuit interrupter of claim 10, further comprising:

a bushing positioned laterally around the movable conductor within the actuator seat central opening, wherein the actuator seat central opening extends from a distal side of the steel seat to a proximal side of the steel seat, and comprises a first section with a first width, a second section with a second width, and a third section with a third width, wherein, in a plane in which the first section of the actuator seat central opening meets the second section of the actuator seat central opening, the steel seat comprises a bushing seating surface on which a portion of the bushing is seated, and wherein, in a plane in which the second section of the actuator seat central opening meets the third section of the actuator seat central opening, the steel seat comprises a vacuum housing seating surface on which the vacuum housing is seated.

16. The hybrid circuit interrupter of claim 15, further comprising:

an insulative cap coupled to a proximal side of the actuator seat, wherein the vacuum housing comprises a bellow shielding cup and a ceramic housing body, wherein a base of the bellow shielding cup is seated on the vacuum housing surface, wherein a rim of the bellow shielding cup is coupled to a distal end of the ceramic housing body, and wherein a proximal side of the insulative cap engages the distal end of the ceramic housing body.

17. The hybrid circuit interrupter of claim 10, wherein the stationary conductor, movable conductor, and vacuum housing form a vacuum interrupter such that the iron core is disposed within an interior of the vacuum housing, and wherein the actuator seat is structured to be coupled to the exterior of the vacuum interrupter.

* * * * *